(No Model.)

J. THOMPSON.
COLLAR FOR CAR AXLES.

No. 259,437. Patented June 13, 1882.

Witnesses
J. J. Lehman.
C. H. Clark

John Thompson, Inventor,
By Tracy, Dyer & Wilber,
Attorneys

UNITED STATES PATENT OFFICE.

JOHN THOMPSON, OF BUCYRUS, OHIO.

COLLAR FOR CAR-AXLES.

SPECIFICATION forming part of Letters Patent No. 259,437, dated June 13, 1882.

Application filed June 13, 1881. (No model.)

*To all whom it may concern:*

Be it known that I, JOHN THOMPSON, of Bucyrus, county of Crawford, and State of Ohio, have invented a new and improved graduated collar for taking up wear in hubs of wheels of bank or pit cars; and I do hereby declare that the following is a full, clear, and exact description of the same, reference being made to the accompanying drawings, and to letters of reference marked thereon.

My invention relates to improvements in preventing end-play or lateral motion in the hubs of wheels produced by service in wheels and axles of bank or pit cars or other vehicles; and my improvement consists in making a number of notches or grooves across the face of the collar or washer, between the linchpin and the hub of the wheel. I accomplish this in the manner set forth below, and as illustrated in the accompanying drawings, in which—

Figure 1:
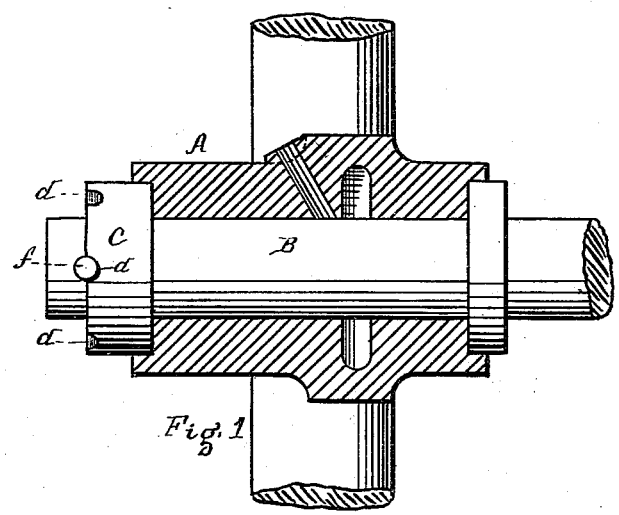
Figure 2:
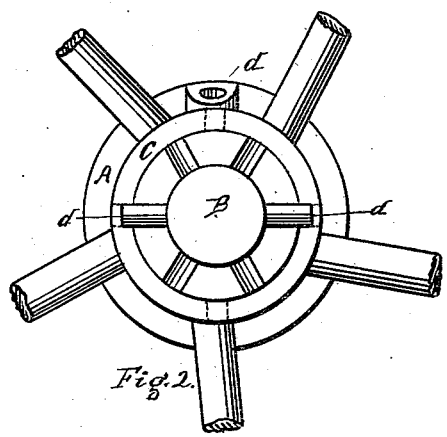

Figure 1 is a longitudinal section of a car or carriage hub with the axle-spindle, having notched collar in place; and Fig. 2 is a front view of hub, showing notched collar and linchpin.

Similar letters refer to similar parts in both drawings.

A, Fig. 1, is a section of an ordinary bank or pit car hub; B, axle or spindle. C is a collar fitted between linchpin and hub. $d\ d$ are notches in the same, and $f$ linchpin in place.

A, Figs. 1 and 2, may be made in the ordinary manner. B is made of sufficient length to admit a collar of some width between the face of the hub and linchpin. This collar is usually made of sufficient width to fill the space between the hub and pin for the purpose of preventing end-play of the axle when in motion. In my improvement this collar is of greater width than the space between the pin and hub. The object of this is to provide for taking up the wear of the collar from time to time as it may become necessary. This I do by a series of notches in the face of the collar, as shown at $d\ d$. These notches, intended for the reception of the linchpin, are made of slightly-increasing depth, the deepest being intended for the reception of the pin when new, the space between the bottom of the notch and the other edge of the collar corresponding with that between the face of the hub and linchpin. When by use the face of the hub or thickness of the collar is so reduced as to admit of end-play in the axle the change of the linchpin to the next deepest notch restores the whole to good working condition again, and so on from time to time, as occasion may require.

Having thus described my invention, what I claim as new, and wish to secure by Letters Patent, is—

In a bank or pit car, the combination, with the axle and wheel, of a collar or washer between the linchpin and the face of the wheel, provided with notches or grooves of varying depth, substantially as and for the purposes set forth and described.

This specification signed and witnessed this 30th day of April, 1881.

JOHN THOMPSON.

Witnesses:
   S. R. HARRIS,
   D. W. LOCKE.